US012229239B2

(12) United States Patent
Ball et al.

(10) Patent No.: US 12,229,239 B2
(45) Date of Patent: Feb. 18, 2025

(54) ASSIGNMENT OF AUTHENTICATION TYPES USING GRAPHICAL ICONS

(71) Applicant: Microsoft Technology Licensing, LLC, Redmond, WA (US)

(72) Inventors: Steven James Ball, Redmond, WA (US); Michael Vincent Mclaughlin, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 385 days.

(21) Appl. No.: 17/545,743

(22) Filed: Dec. 8, 2021

(65) Prior Publication Data

US 2023/0177135 A1 Jun. 8, 2023

(51) Int. Cl.
*G06F 21/36* (2013.01)

(52) U.S. Cl.
CPC .................... *G06F 21/36* (2013.01)

(58) Field of Classification Search
CPC ........................................... G06F 21/36
See application file for complete search history.

(56) References Cited

U.S. PATENT DOCUMENTS

| 8,484,694 | B2 | 7/2013 | Diebler et al. |
| 9,619,770 | B2 | 4/2017 | Bisroev et al. |
| 10,050,787 | B1* | 8/2018 | Johansson ............. H04L 9/0866 |
| 2006/0041858 | A1 | 2/2006 | Yan et al. |
| 2016/0092176 | A1 | 3/2016 | Straub et al. |
| 2016/0224651 | A1 | 8/2016 | Kumarasamy et al. |
| 2018/0203988 | A1* | 7/2018 | Hamlin .................. G06F 21/36 |
| 2020/0279070 | A1 | 9/2020 | Rose et al. |

OTHER PUBLICATIONS

"WYSIWYG editor component 'CKEditor' for commercially available rich text editor implementation", Retrieved from: https://www.tegakari.net/en/2021/05/ckeditor/, May 13, 2021, 4 Pages.

* cited by examiner

*Primary Examiner* — Stephen S Hong
*Assistant Examiner* — Darrin Hope (57) ABSTRACT

According to examples, an apparatus may include a processor and a memory on which is stored machine-readable instructions that when executed by the processor, may cause the processor to cause a graphical user interface to be displayed, the graphical user interface including graphical icons of a plurality of authentication types available for assignment to users and a graphical icon of a first user. The instructions may also cause the processor to detect a movement of a graphical icon of a first authentication type from a first location to a second location in the graphical user interface, the second location corresponding to the graphical icon of the first user and based on the detected movement, assign the first authentication type to the first user.

20 Claims, 6 Drawing Sheets

ASSIGNMENT OF AUTHENTICATION TYPES USING GRAPHICAL ICONS

BACKGROUND

Corporations and other organizations may require that their employees and other associates provide authentication credentials in order to access various equipment, services, and websites. In many instances, the corporations or other organizations may employ multi-factor authentication techniques to authenticate the employees and other associates to increase security.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Effective authentication of users has been in great demand to prevent hacking, fraud, and theft of services. For instance, accurate identification and authentication of users for the purposes of services such as credit card services, account information services such as mortgage, savings, and investment accounts, banking services, automatic teller machine (ATM) services, etc. has greatly increased. Some authentication systems typically require a multi-factor authentication process to enable user access to the services.

In order to be authenticated to access various equipment, services, and/or websites, users may provide their credentials. The types of credentials that the users provide may depend on the authentication types that are set for the users. For instance, a first authentication type may include credentials directed to passwords, a second authentication type may include credentials directed to one-time passcodes, a third authentication type may include credentials directed biometric features, a fourth authentication type may include credentials directed to possession of an electronic token device, etc. Some of the authentication types may provide relatively greater security than other ones of the authentication types. For instance, the second authentication type that may require entry of one time passcodes may be relatively more secure than the first authentication type. However, the more secure authentication types may require greater levels of burden on the users, e.g., it may be easier for users to use electronic token devices than for users to obtain and enter one time codes.

Many corporations and organizations have information technology (IT) personnel who may have specific knowledge as to how best to assign various authentication types to users. For instance, the IT personnel may assign the various types of authentication methods to users such that intended levels of security are attained while also reducing or minimizing burdens on the users in becoming authenticated. By way of particular example in which a user may have access solely to a low security level equipment, the IT personnel may determine that the user may need to be assigned a lowest level authentication type and may know how to assign that authentication type to the user.

Some organizations, such as schools, organizations with a relatively small number of employees (e.g., less than about 100 employees), organizations with non-IT users, and/or the like, may not have personnel who have the requisite training and/or experience to assign appropriate (e.g., both secure and simple) authentication types that the users in the organization are to use in being authenticated. For instance, the personnel my not have a technical understanding as to how the authentication types may be assigned to or set for the users. Additionally, the personnel may not have the requisite training and/or experience to determine which of the authentication types may be the most appropriate for the users. For instance, the personnel may not know which authentication types provide a sufficient or intended level of security while also providing a sufficient or intended level of burden on the users. As a result, the users may be assigned with authentication types that may not provide sufficient security or may provide unnecessary levels of security and thus, unnecessary levels of burden on the users.

A technical issue with known methods for assigning authentication types to users may be that the users may be provided with authentication types that may provide insufficient security to equipment, websites, data, and/or the like. This may result in access by unintended and/or malicious users to those equipment, websites, data, and/or the like. Additionally, when incorrect authentication types are assigned to the users, new authentication types may be required to be assigned to the users. The assignment of the new authentication types to replace the previously assigned authentication types may result in increased processor and network bandwidth consumption. This may also result in simplified management of user credentials and authentication processes.

Disclosed herein are apparatuses, methods, and computer-readable media for providing a platform through which entities may relatively easily set or assign authentication types to be used by users to use in their respective authentication processes. Particularly, a processor may cause a graphical user interface to be displayed to an entity, in which the graphical user interface may include graphical icons of a plurality of authentication types available for assignment to the users. The graphical user interface may also include graphical icons of a plurality of users to which the authentication types are to be assigned. In addition, the entity may assign at least one of the available authentication types to each of the users by, for instance, selecting and moving certain ones of the graphical icons corresponding to the available authentication types to locations corresponding to the graphical icons of the users.

According to examples, the processor may provide the entity with information pertaining to what the selected authentication types for each of the users may mean for sequential authentication types and, in some instances, recovery of lost credentials. For instance, the processor may provide the entity, e.g., through the graphical user interface, with preview screens that sequentially depict the outcomes of the movements of the graphical icons of the authentication types. In other words, the preview screens may show the entity which of the authentication types have been respectively assigned to the users and the order in which the authentication types are to be used in authenticating the users. In some instances, the preview screens may show the entity which of the authentication types are the primary authentication types and which are to be used for recovery of credentials. The entity may thus be provided with displays that the entity may use to determine the users are being assigned intended authentication types, which may enable the entity to accurately assign the authentication types to the users.

The preview screens may also depict security results of the assignments of the authentication types to the users. That is, the preview screens may show the entity security levels of the authentication type assignments. By way of particular example, the preview screens may depict whether the authentication type assignment has a low security level, a medium security level, or a high security level. The preview screens may also depict user burden levels associated with the authentication type assignments. In one regard, the entity may weigh the security levels against the user burden levels in determining an optimized combination of authentication type assignments for the users. A combination of authentication type assignments may be deemed to be optimized when an intended level of security is attained while also minimizing burden on a user or when an intended burden level on a user is attained while maximizing the security level provided by the authentication type assignments.

In instances in which the entity assigns multiple authentication types to a particular user, the multiple authentication types may have different priorities with respect to each other. The different priorities may include a higher priority level in which the user may be required to provide the correct credentials for the assigned authentication type having the higher priority level each time the user attempts to access a certain account through a website. The different priorities may also include a lower priority level in which the user may be required to provide the correct credentials for the assigned authentication type having the lower priority level each time the user attempts to access another certain account through a website. As another example, the higher or lower priority level authentication type may be an authentication type that the user may have to pass to recover a lost credential, such as a user identifier or a password.

According to examples, the entity may control the priority levels of the multiple authentication types assigned to the user through movement of the graphical icons representing the authentication types. For instance, the entity may control the priority levels by arranging the graphical icons in a certain order with respect to each other. As another example, the graphical user interface may include multiple fields assigned to a graphical icon of the user, in which each of the multiple fields corresponds to a different priority level.

In some examples, the entity may assign multiple authentication types respectively available to each of the users. The users may be presented with the multiple authentication types respectively available to them and the users may select which of the multiple authentication types respectively available to them to be set for them to use in being authenticated. Thus, a first user may select the authentication types that the first user is to use in being authenticated from the multiple authentication types available to the first user. The first user may also select the authentication type that the first user is to use to recover a lost credential. In these examples, the users may also be shown a graphical user interface that includes graphical icons of the multiple authentication types respectively available to the users and the users may select the authentication types that they are to use by moving the graphical icons to certain locations in the displayed graphical user interface. The users may provide the selected authentication types to the processor disclosed herein and the processor may set and/or store the selected authentication types for the users.

According to examples, the entity and the users may be employees or otherwise affiliated with an organization. The entity may or may not have IT experience, experience with assigning authentication types to users, and/or the like. By way of particular example, the organization may be an educational institution in which the entity may be a teacher and the users may be students. As another example, the organization may be a family in which the entity may be a parent and the users may be children. As a further example, the organization may be a small business in which the entity may be a business owner or a frontline manager and the users may be employees of the business.

As discussed herein, a processor may cause a graphical user interface to be displayed, for instance, on an entity computing device via a network. The graphical user interface may include graphical icons of a plurality of authentication types available for assignment to users and a graphical icon of a first user (or graphical icons of a plurality of users). The processor may detect movements of graphical icons of authentication types in the graphical user interface. In addition, based on the detected movements, the processor may assign various ones of the authentication types to the user or users. Through implementation of the features of the present disclosure, a processor may provide entities with the ability to graphically assign authentication types to users. The processor may also provide the entities with information pertaining to how the authentication type assignments may affect security levels. In this regard, the processor may enable the entities to accurately determine and assign the authentication types for users. Technological improvements afforded by the features of the present disclosure may thus include optimization of security on the devices, data, and/or websites to which the users use the authentication types to access, Additionally, the accurate determination and assignment of the authentication types may reduce the number of times that the authentication types may be assigned to the users, which may reduce or optimize the consumption of power and computing resources utilized in the determination and assignment of the authentication types to the users.

Figure 1A:
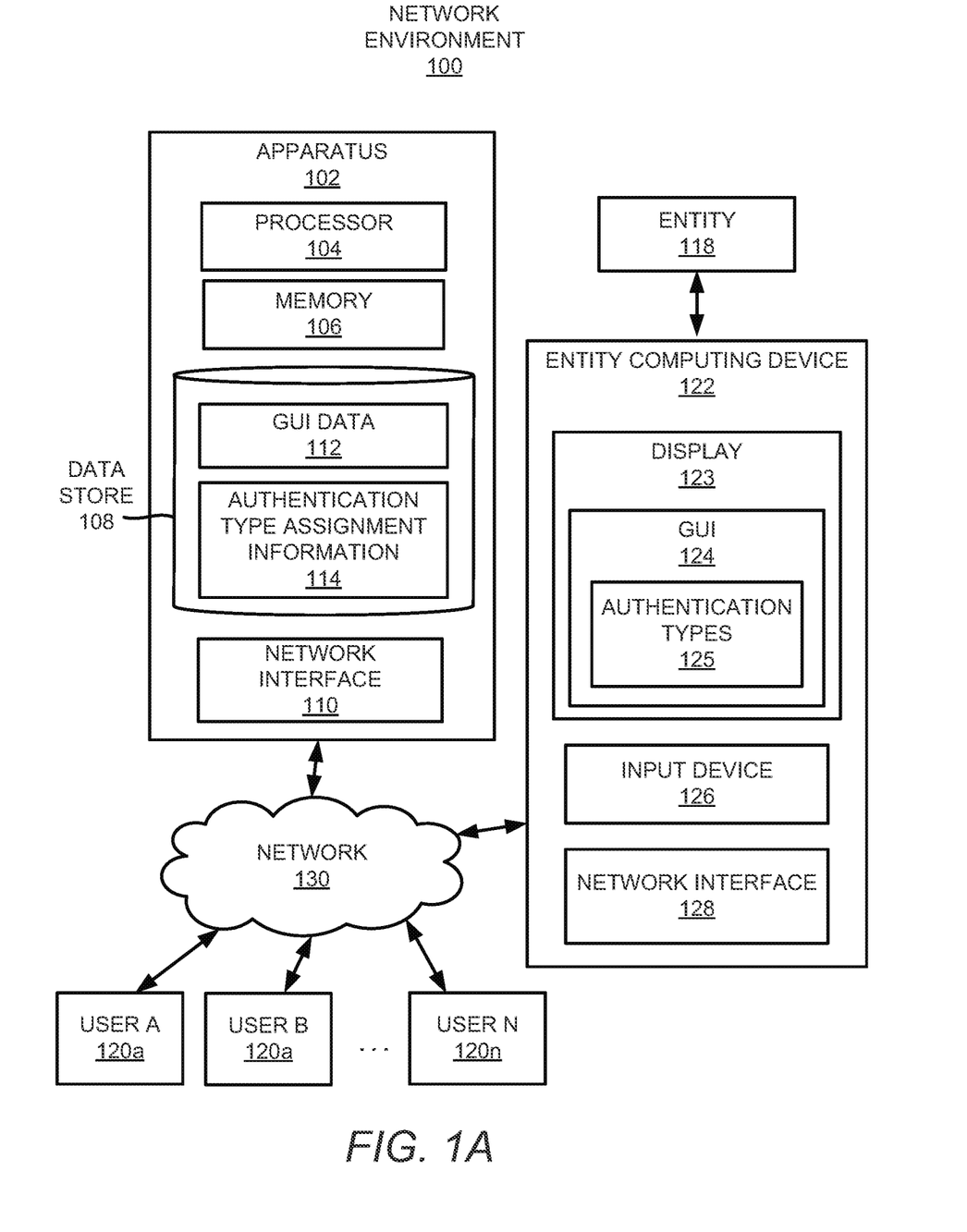
FIG. 1A shows a block diagram of a network environment, in which an apparatus may cause a graphical user interface to be displayed to an entity for the entity to graphically assign authentication types to users, in accordance with an embodiment of the present disclosure.
Figure 1B:
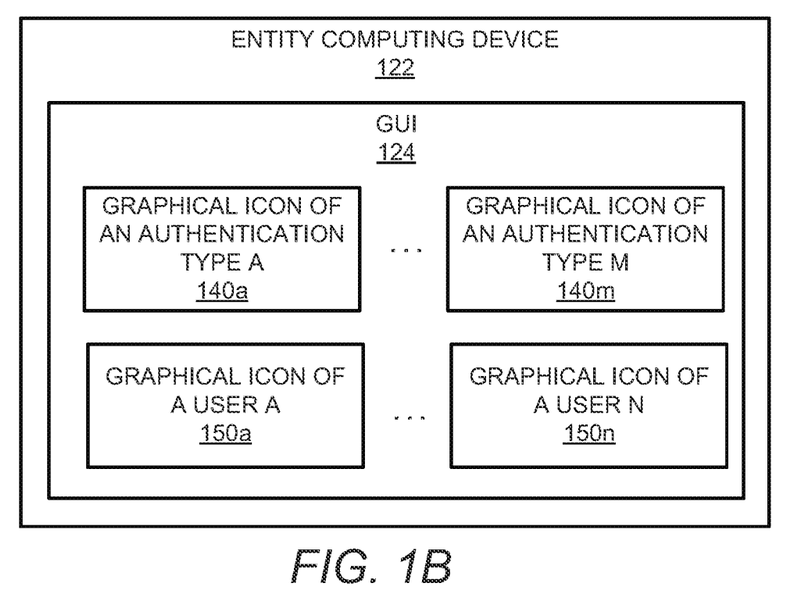
FIGS. 1B and 1C, respectively, depict block diagrams of an entity computing device on which a graphical user interface may be displayed in a first state and a second state, in accordance with an embodiment of the present disclosure.
Figure 1C:
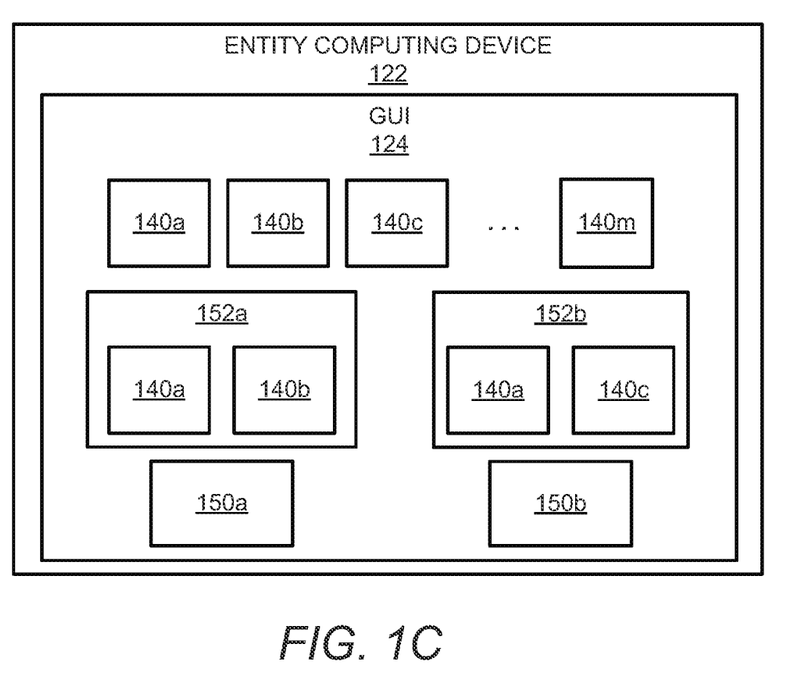
Figure 2:
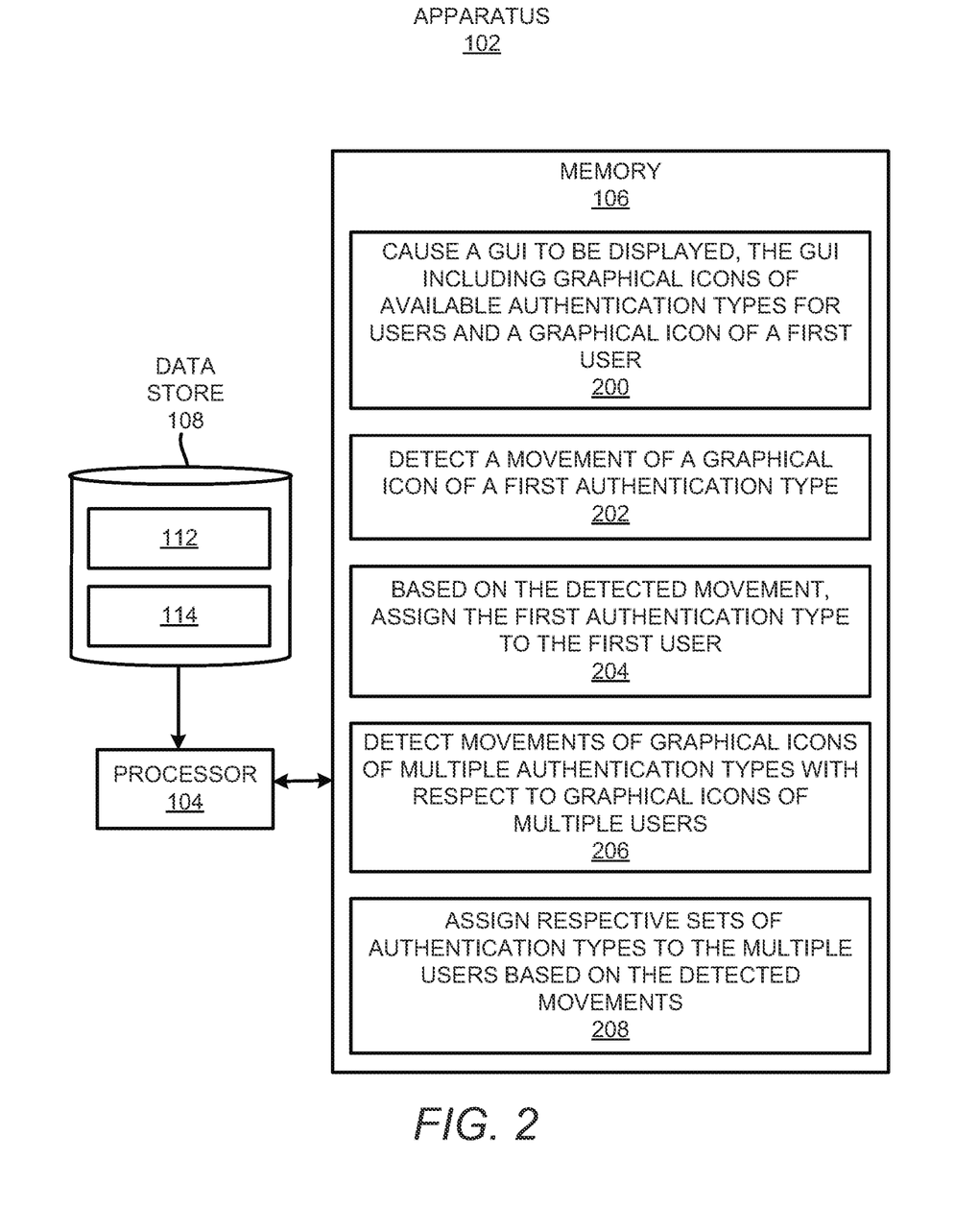
FIG. 2 depicts a block diagram of the apparatus depicted in FIG. 1A, in accordance with an embodiment of the present disclosure.

Reference is first made to FIGS. 1A-1C and 2. FIG. 1A shows a block diagram of a network environment 100, in which an apparatus 102 may cause a graphical user interface (GUI) 124 to be displayed to an entity 118 for the entity 118 to graphically assign authentication types 125 to users 120a-120n, in accordance with an embodiment of the present disclosure. FIGS. 1B and 1C, respectively, depict block diagrams of an entity computing device 122 on which a GUI 124 may be displayed in a first state and a second state, in accordance with an embodiment of the present disclosure. FIG. 2 depicts a block diagram of the apparatus 102 depicted in FIG. 1A, in accordance with an embodiment of the present disclosure. It should be understood that the network environment 100, the apparatus 102, and/or the entity computing device 122 may include additional features and that some of the features described herein may be removed and/or modified without departing from the scopes of the network environment 100, the apparatus 102, and/or the entity computing device 122.

As shown in FIG. 1A, the network environment 100 may include the apparatus 102, users 120a-120n (in which the variable "n" may denote a value greater than one), an entity 118, an entity computing device 122, and a network 130. The apparatus 102 may be a computing device such as a server, a laptop computer, a desktop computer, a tablet computer, and/or the like. In particular examples, the apparatus 102 is a server on the cloud that may communicate with the entity computing device 122 and in some instances, computing devices of the users 120a-120n over the network 130. The network 130 may be an internal network, such as a local area network, or an external network, such as the Internet.

As shown in FIGS. 1 and 2, the apparatus 102 may include a processor 104 that may control operations of the apparatus 102, The apparatus 102 may also include a memory 106 on which instructions that the processor 104 may access and/or may execute may be stored. In addition, the processor 104 may include a data store 108 on which the processor 104 may store various information. The processor 104 may be a semiconductor-based microprocessor, a central processing unit (CPU), an application specific integrated circuit (ASIC), a field-programmable gate array (FPGA), and/or other hardware device.

The memory 106 and the data store 108, which may also each be termed a computer readable medium, may each be, for example, a Random Access memory (RAM), an Electrically Erasable Programmable Read-Only Memory (EEPROM), a storage device, or the like. The memory 106 and/or the data store 108 may be a non-transitory computer readable storage medium, where the term "non-transitory" does not encompass transitory propagating signals. In any regard, the memory 106 may have stored thereon machine-readable instructions that the processor 104 may execute. The data store 108 may have stored thereon data that the processor 104 may enter or otherwise access.

Although the apparatus 102 is depicted as having a single processor 104, it should be understood that the apparatus 102 may include additional processors and/or cores without departing from a scope of the apparatus 102. In this regard, references to a single processor 104 as well as to a single memory 106 may be understood to additionally or alternatively pertain to multiple processors 104 and/or multiple memories 106, In addition, or alternatively, the processor 104 and the memory 106 may be integrated into a single component, e.g., an integrated circuit on which both the processor 104 and the memory 106 may be provided. In addition, or alternatively, the operations described herein as being performed by the processor 104 may be distributed across multiple apparatuses 102 and/or multiple processors 104.

According to examples, the users 120a-120n may each be a member of an organization, such as an employee, a student, a family member, and/or the like. The entity 118 may also be a member of the organization, such as the owner of the organization, a teacher or other faculty member of the organization, a mother or father of a family, and/or the like, hi other examples, however, some or all of the users 120a-120n and/or the entity 118 may be people who are outside of the organization.

The entity 118 may be an individual who may be responsible for assigning authentication types to the users 120a-120n, in which the users 120a-120n are to provide information, e.g., credentials, respectively corresponding to the authentication types 125 to be authenticated to access certain data, device, software, websites, and/or the like. In some examples, the entity 118 may assign a plurality of authentication types 125 that may be available for selection by the users 120a-120n, For instance, the entity 118 may assign a first authentication type, a second authentication type, and a third authentication type to a first user 120a as authentication types that are available to a first user 120a. In these examples, the first user 120a may be provided with the assigned available authentication types and the first user 120a may select a subset of the available authentication types as the authentication types that the first user 120a is to use in being authenticated (or to recover lost credentials).

The authentication types 125 may include a variety of different authentication types, in which the different authentication types may include different challenges that the users 120a-120n may be required to meet in order to be authenticated. The authentication challenges may include user credentials, such as user names, user identifiers, passwords, pre-arranged secret questions, etc. Other authentication challenges may include proof that the user 120a has an electronic token device in their possession, that the user 120a has a certain biometric feature, e.g., a fingerprint, facial features, retinal or iris features, voice features, etc. Still further authentication challenges may include proof that the user has received a correct one-time passcode, e.g., via a text message or an email message. The different authentication types may include other types of challenges not specifically listed in the present disclosure.

As shown in FIG. 2, the memory 106 may have stored thereon machine-readable instructions 200-208 that the processor 104 may execute. As shown, the processor 104 may execute the instructions 200 to cause a graphical user interface (GUI) 124 to be displayed, for instance, on a display 123 of an entity's 118 computing device 122, The entity computing device 122 may be a laptop computer, a desktop computer, a tablet computer, a smartphone, and/or the like. As discussed in greater detail herein, the GUI 124 may include graphical icons of the authentication types 125.

According to examples, the data store 108 may have stored thereon GUI data 112 that may include instructions or code that the entity computing device 122 may use to display the GUI 124 on the display 123. The processor 104 may communicate the GUI data 112 to the entity computing device 122 via the network 130. For instance, the processor 104 may communicate the GUI data 112 through a network interface 110 and the entity computing device 122 may receive the GUI data 112 through a network interface 128. The network interfaces 110, 128 may each include hardware and/or software that may enable data to be sent and received via the network 130.

The GUI data 112 may include code that may cause graphical icons 140*a*-140*m* (the variable "m" may represent a value greater than one) of authentication types 125 to be displayed in a certain manner in the GUI 124. The code in the GUI data 112 may cause the graphical icons 140*a*-140*m* of authentication types 125 to have certain appearances, to denote the authentication type to which they correspond, to be positioned at certain locations within the GUI 124, to be movable to other locations in the GUI 124, etc. According to examples, each of the graphical icons 140*a*-140*m* of the authentication types 125 may be graphical representations of an authentication type 125. For instance, the graphical icons 140*a*-140*m* of the authentication types 125 may include graphical and/or textual features to distinguish the graphical icons 140*a*-140*m* from each other.

The code in the GUI data 112 may also cause graphical icons 150*a*-150*n* (the variable "n" may represent a value greater than one) of the users 120*a*-120*n* to be displayed in a certain manner hi the GUI 124. The code in the GUI data 112 may cause the graphical icons 150*a*-150*n* of users 120*a*-120*n* to have certain appearances, to denote the users 120*a*-120*n* to which the graphical icons 150-150*n* correspond, to be positioned at certain locations within the GUI 124, to be movable to other locations in the GUI 124, etc. According to examples, each of the graphical icons of the users 120*a*-120*n* may be graphical representations of a user 120*a*-120*n*. For instance, the graphical icons 150-150*n* of the users 120*a*-120*n* may include graphical and/or textual features to distinguish the graphical icons 150*a*-150*n* from each other.

The processor 104 may execute the instructions 202 to detect a movement of a graphical icon 140*a* of a first authentication type from a first location to a second location in the GUI 124. For instance, the graphical icons 140*a*-140*m* may be positioned around each other in the first location of the GUI 124 and the second location may correspond to a graphical icon 150*a* of a first user 120*a*. That is, the second location may be a location near or otherwise assigned to the first user 120*a*. The processor 104 may determine that the entity 118 has moved the graphical icon 140*a* of the first authentication type from the first location to the second location. In addition, the processor 104 may determine that the entity 118 intends to assign the first authentication type to the first user 120*a* based on the detection of the movement of the graphical icon 150*a* to the second location.

According to examples, the entity computing device 122 may include an input device 126 that the entity 118 may use to move the graphical icon 140*a* from the first location to the second location in the GUI 124. The input device 126 may be a mouse, a tracking pad, a keyboard, and/or the like, that the entity 118 may use to interact with the entity computing device 122. The entity computing device 122 may communicate an indication of the detected movement of the graphical icon 140*a* of the first authentication type to the second location to the apparatus 102. The processor 104 may determine that the entity 118 has moved the graphical icon 140*a* of the first authentication type from the first location to the second location from the received indication. In addition, the entity 118 may be provided with a preview screen that displays how the authentication types will be assigned to the users 120*a*-120*n*. As a result, the entity 118 may graphically be provided with the outcomes of the entity's 118 assignments of the authentication types to the users 120*a*-120*n*.

Examples of a GUI 124 in which the graphical icons 140*a*-140*m* of the authentication types and the graphical icons 150*a*-150*n* of the users 120*a*-120*n* are depicted in FIGS. 1B and 10. FIG. 10 also shows an example in which a second location 152*a* corresponding to the graphical icon 150*a* of a first user 120*a* and a second location 152*b* corresponding to the graphical icon 150*b* of a second user 120*b* are depicted in the GUI 124. According to these examples, an entity 118 may have selected a graphical icon 140*a* of the first authentication type, for instance, by clicking and holding down a mouse button while a cursor is above the graphical icon 140*a*. The clicking and holding down of the mouse button may cause the graphical icon 140*a* to be duplicated and the entity 118 may have dragged the duplicated version of the graphical icon 140*a* to the second location 152*a* corresponding to the graphical icon 150*a* of the first user 120*a*. The entity 118 may have performed a similar operation to position a copy of the graphical icon 140*b* corresponding to a second authentication type in the second location 152*a* corresponding to the graphical icon 150*a* of the first user 120*a*. The entity 118 may have also performed similar operations to position copies of the graphical icons 140*a* and 140*c* in the second location 152*b* corresponding to the graphical icon 150*b* of a second user 120*b*.

In some examples, the processor 104 may assign different priority levels to the authentication types corresponding to the graphical icons 140*a*, 140*b* depending upon the locations at which the entity 118 placed the graphical icons 140*a*-140*m* with respect to the graphical icons 150*a*-150*n*. For instance, the processor 104 may assign the first authentication type a first priority level based on the graphical icon 140*a* of the first authentication type being moved to the second location 152*a* in the graphical user interface. In addition, the processor 104 may assign the second authentication type a second priority level based on the graphical icon 140*a* of the second authentication type being moved to another location with the second location 152*a* (e.g., a fourth location in the GUI 124). The priority levels may correspond to the order in which the user 120*a* is to enter the credentials to meet the challenges corresponding to the authentication types. For instance, the authentication type having the higher priority level may be used as a primary credential type and the authentication type having the lower priority level may be used for recovery purposes.

By way of particular example, the GUI 124 may display the graphical icons 150*a*, 150*b* of the users 120*a*, 120*b* along an X-axis of a graph and the graphical icons 140*a*-140*b* along a Y-axis of the graph. In these examples, the second locations 152*a*, 152*b* may be areas in the Y direction above the respective graphical icons 150*a*, 150*b*. In other examples, the GUI 124 may display other types of graphical depictions of the second locations 152*a*, 152*b* around or near the respective graphical icons 150*a*, 150*b* of the users 120*a*, 120*b*.

The entity 118 may assign the authentication types to the users 120*a*-120*n* based on, for instance, the types and/or responsibilities of the users 120*a*-120*n* within an organization. For instance, those users 120*a*-120*n* having higher security clearance levels may be assigned authentication types that require the most secure credentials. Additionally, those users 120*a*-120*n* having lower security clearance levels and/or access to lower importance information may be assigned authentication types that require the least secure credentials. In some examples, the processor 104 may prevent the entity 118 from assigning certain ones of the authentication types to certain ones of the users 120a-120n. For instance, the processor 104 may cause a subset of the graphical icons 140a-140m that may be assigned to a certain user 120a to be displayed in the GUI 124. In addition, the processor 104 may change the subset of graphical icons 140a-140m displayed to the users 120a-120n depending upon, for instance, the titles of the users 120a-120n, the responsibilities of the users 120a-120n, the ages of the users 120a-120n, and/or the like.

The processor 104 may execute the instructions 204 to, based on the detected movement of the graphical icon 150a of the first authentication type, assign the first authentication type to the first user 120a. For instance, the processor 104 may store an identification of the assignment of the first authentication type to the first user 150 as authentication type assignment information 114 in the data store 108. In other examples, the processor 104 may forward the assignment of the first authentication type to the first user 120a to another apparatus (not shown) that may authenticate the first user 120a.

According to examples, the processor 104 may execute the instructions 206 to detect movements of graphical icons 140a-140m of multiple authentication types with respect to the graphical icons 150a-150n of multiple users 120a-120n. In these examples, the entity 118 may assign multiple authentication types to multiple users 120a-120n by moving the graphical icons 140a-140m of the multiple authentication types to the second locations corresponding to the respective graphical icons 150a-150n of the users 120a-120n. In addition, the processor 104 may execute the instructions 208 to assign respective sets of authentication types to the multiple users 120a-120n based on the detected movements of the graphical icons 140a-140m with respect to the second locations corresponding to the graphical icons 150a-150m of the users 120a-120n.

According to examples in which the entity 118 has moved multiple ones of the graphical icons 140a, 140b to the second locations 152 corresponding to the first user 120a, the processor 104 may assign the authentication types represented by the graphical icons 140a, 140b as authentication types that the user 120a is to use in a multi-factor authentication process. In other examples, the entity 118 may assign one of the authentication types as a primary authentication type and the other one of the authentication types as a secondary authentication type. In still other examples, the entity 118 may assign one of the authentication types as a primary authentication type and the other one of the authentication types as an authentication type that the user 120a is to use in a process to recover credentials for the primary authentication type.

According to examples, the multiple authentication types assigned to the user 120a may be authentication types that the first user 120a is able to select for use by the first user 120a-120n in first user authentication processes. In this regard, the multiple authentication types may be assigned as authentication types that are available to the user 120a. in these examples, the user 120a may select the authentication types that the user 120a wishes to use for authentication processes. For instance, the processor 104 may cause the authentication types available for the user 120a to be displayed on a computing device of the user 120a and the user 120a may select the authentication types that the user is to use from the authentication types that are available to the user 120a. The authentication types may be presented to the user 120a in graphical form to make the selection process relatively simple. The processor 104 may receive the selected authentication types and may set the selected authentication types for use by the user 120a in the authentication processes of the user 120a.

According to examples, the authentication types assigned to certain users and/or groups of users may be tracked over time to generate a training set of authentication types. The training set may be used to train a machine-learning classifier/artificial intelligence algorithm to recommend authentication type assignments to other users and/or groups, That is, for instance, patterns in the assignments of the authentication types to certain users and/or groups of users may be determined and the authentication type assignments for a future set of users may be automated. The processor 104 may make this determination and may present the automated authentication type assignments as a displayed preview to an entity 118. The entity 118 may also elect to accept the automated authentication type assignments, modify the automated authentication type assignments, or discard the automated authentication type assignments. In this regard, the processor 104 may receive an input regarding the displayed assignment of the authentication types for the set of users from the entity 118.

Although the instructions 200-208 are described herein as being stored on the memory 106 and may thus include a set of machine-readable instructions, the apparatus 102 may include hardware logic blocks that may perform functions similar to the instructions 200-208. For instance, the processor 104 may include hardware components that may execute the instructions 200-208. In other examples, the apparatus 102 may include a combination of instructions and hardware logic blocks to implement or execute functions corresponding to the instructions 200-208. In any of these examples, the processor 104 may implement the hardware logic blocks and/or execute the instructions 200-208. As discussed herein, the apparatus 102 may also include additional instructions and/or hardware logic blocks such that the processor 104 may execute operations in addition to or in place of those discussed above with respect to FIG. 2.

Figure 3:
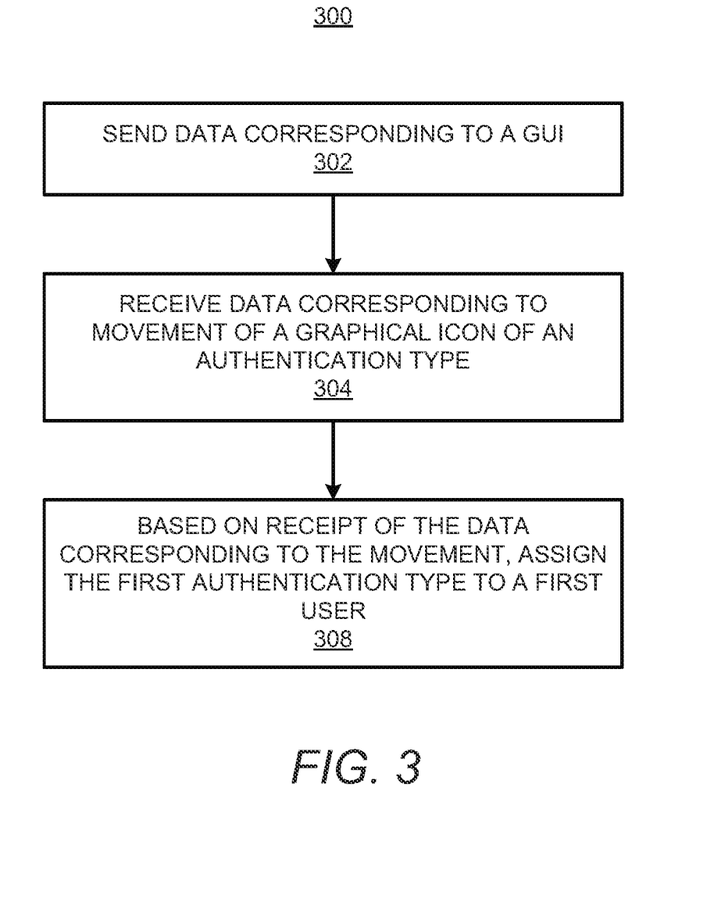
FIGS. 3 and 4, respectively, depict flow diagrams of methods for assigning authentication types to users based on movements of graphical icons representing the authentication types with respect to graphical icons representing the users, in accordance with embodiments of the present disclosure.
Figure 4:
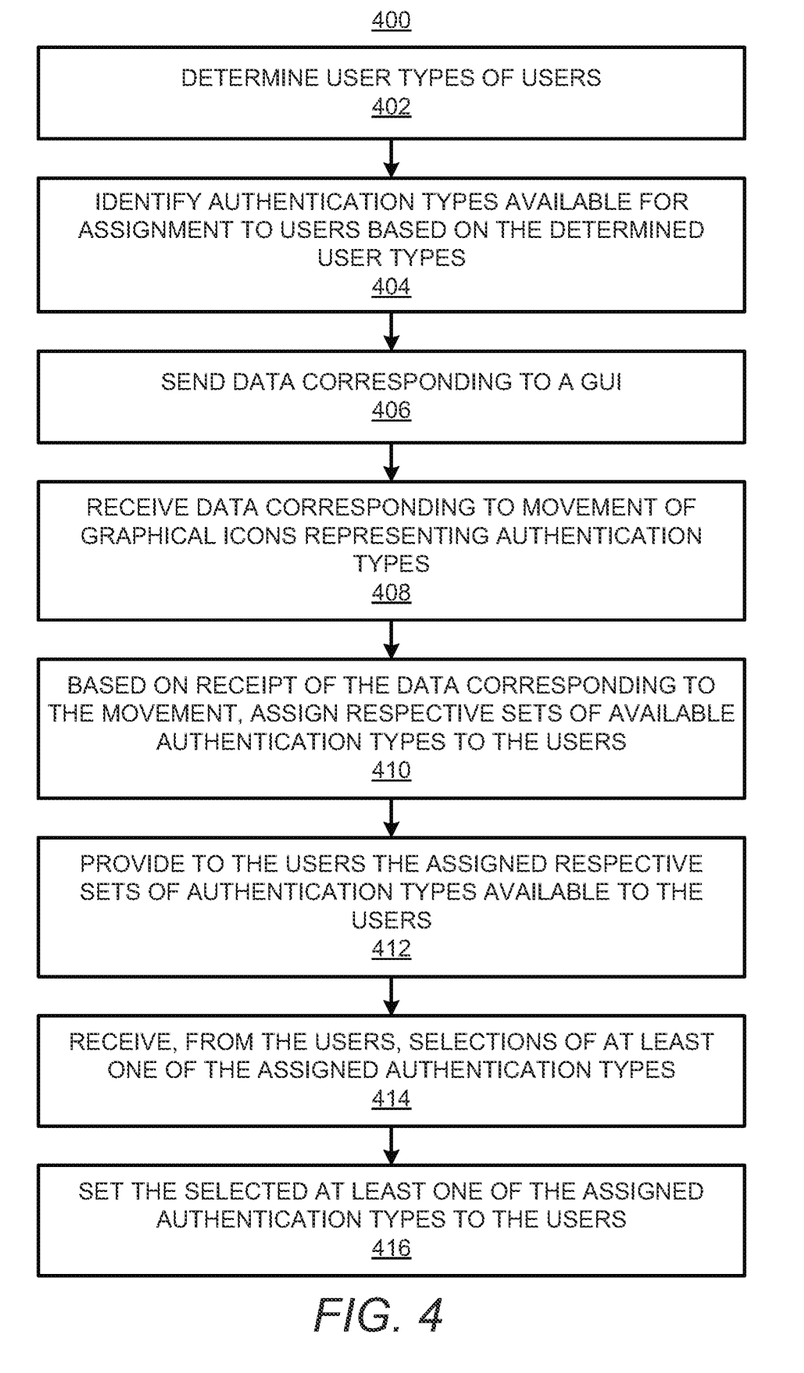

Various manners in which the processor 104 of the apparatus 102 may operate are discussed in greater detail with respect to the methods 300 and 400 respectively depicted in FIGS. 3 and 4. Particularly, FIGS. 3 and 4, respectively, depict flow diagrams of methods 300, 400 for assigning authentication types to users 120a-120n based on movements of graphical icons 140a-140m representing the authentication types with respect to graphical icons 150a-150n representing the users 120a-120n, in accordance with embodiments of the present disclosure. It should be understood that the methods 300, 400 may include additional operations and that some of the operations described therein may be removed and/or modified without departing from the scopes of the methods 300, 400. The descriptions of the methods 300, 400 are made with reference to the features depicted in FIGS. 1A-1C and 2 for purposes of illustration.

At block 302, the processor 104 may send data 112 corresponding to a graphical user interface (GUI) 124 to a computing device 122 of an entity 118. The data 112 is to cause the computing device 122 to display the GUI 124 to include graphical icons 140a-140m of a plurality of authentication types available for assignment to users 120a-120n.

In some examples, the processor 104 may determine a user type of the first user 120a. The user type may be, for instance, a title of the user, the rank of the user, the age of the user, the position of the user within an organization, and/or the like. In these examples, the processor 104 may identify the plurality of authentication types available for assignment to the first user 120a according to the determined user type of the first user 120a. For instance, different user types may have different sets of authentication types available to them. The processor 104 may also send data 112 corresponding to the GUI 124 to cause the computing device 122 to display the GUI 124 to include the graphical icons 140a-140m of the identified plurality of available authentication types.

According to examples, the processor 104 may restrict assignment of the first set of the available authentication types to the first user 120a based on a determined user type of the first user 120a. In addition, the processor 104 may restrict assignment of the second set of the available authentication types to the second user 120b based on a determined user type of the second user 120b. The processor 104 may restrict assignments of the available authentication types by restricting the graphical icons displayed to those that are available to the users 120a-120n according to their types. As another example, the processor 104 may restrict the assignments by blocking the entity 118 from moving the graphical icons representing certain ones of the authentication types to the locations corresponding to the graphical icons 150a-150n representing certain ones of the users 120a-120n.

At block 304, the processor 104 may receive data corresponding to a movement of a graphical icon 140a of a first authentication type from a first location to a second location 152a in the GUI 124. The second location 1542a may correspond to the graphical icon 150a of the first user 120.

At block 306, the processor 104 may, based on the receipt of the data corresponding to the movement of the graphical icon 140a of the first authentication type, assign the first authentication type to the first user 120.

According to examples, the processor 104 may send the data 112 to cause the computing device 122 to display the GUI 124 to also include graphical icons 150a-150n of a plurality of users 120a-120n. In these examples, GUI 124 may include locations corresponding to the respective graphical icons 150a-150n of (e.g., representing) the plurality of users 120a-120n at which multiple ones of the graphical icons 140a-140m representing the plurality of available authentication types are able to be positioned. In addition, the processor 104 may receive data corresponding to movements of the multiple ones of the graphical icons 140a-140m representing the plurality of available authentication types with respect to the locations.

The processor 104 may determine that a first set of the graphical icons 140a-140m representing the available authentication types has been moved to a first location 152a corresponding to the graphical icon 150a of a first user 120. The processor 104 may also determine that a second set of the graphical icons 140a-140m representing the available authentication types has been moved to a second location 152b corresponding to the graphical icon 150b of a second user 120b. In addition, the processor 104 may assign the first set of the available authentication types to the first user 120a and may assign the second set of the available authentication types to the second user 120b.

In some examples, the processor 104 may provide to the first user 120a, the first set of available authentication types assigned to the first user 120a. The processor 104 may also receive, from the first user 120a, a selection of at least one of the authentication types from the first set of available authentication types. The processor 104 may further set the selected at least one of the authentication types to the first user 120a, in which the first user 120a is to use the set at least one of the authentication types in a first user 120a authentication process.

According to examples, the processor 104 may determine whether the first user 120a has already been assigned the hardware needed to use the selected authentication type. By way of example, the hardware may be a certain type of badge, a NFC device, a Fast ID Online (FIDO) device, or the like. In instances in which the processor 104 determines that the first user 120a has not been assigned the hardware needed to use the selected authentication type, the processor 104 may cause ordering or procurement processes to auto-obtain and send the hardware to the first user 120. Appropriate confirmation steps may be performed and/or notifications to departments and budgets impacted may be sent. This may also trigger the replacement of lost or damaged hardware.

According to examples, the processor 104 may determine an order at which the first user 120a arranged the graphical icons 150a-150n of the selected at least one of the authentication types. The processor 104 may also set the selected at least one of the authentication types in an order of priority based on the determined order at which the first user 120a arranged the graphical icons 150a-150n of the selected at least one of the authentication types.

Turning now to FIG. 4, at block 402, the processor 104 may determine user types of users 120a-120n. At block 404, the processor 104 may identify authentication types available for assignment to the users 120a-120n based on the determined user types of the users 120a-120n. At block 406, the processor 104 may send data 112 corresponding to a GUI 124, for instance, to the entity computing device 122. At block 408, the processor 104 may receive data corresponding to movement of graphical icons 140a-140m representing the authentication types. At block 410, based on receipt of the data corresponding to the movement of the graphical icons 140a-140m, the processor may assign respective sets of available authentication types to the users 120a-120n.

At block 412, the processor 104 may provide to the users 120a-120n the assigned respective sets of authentication types available to the users 120a-120n. At block 414, the processor 104 may receive, from the users 120a-120n, selections of at least one of the assigned authentication types available to the users 120a-120n. At block 416, the processor 104 may set the selected at least one of the assigned authentication types to the users 120a-120n.

Some or all of the operations set forth in the methods 300 and 400 may be included as utilities, programs, or subprograms, in any desired computer accessible medium. In addition, the methods 300 and 400 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 5:
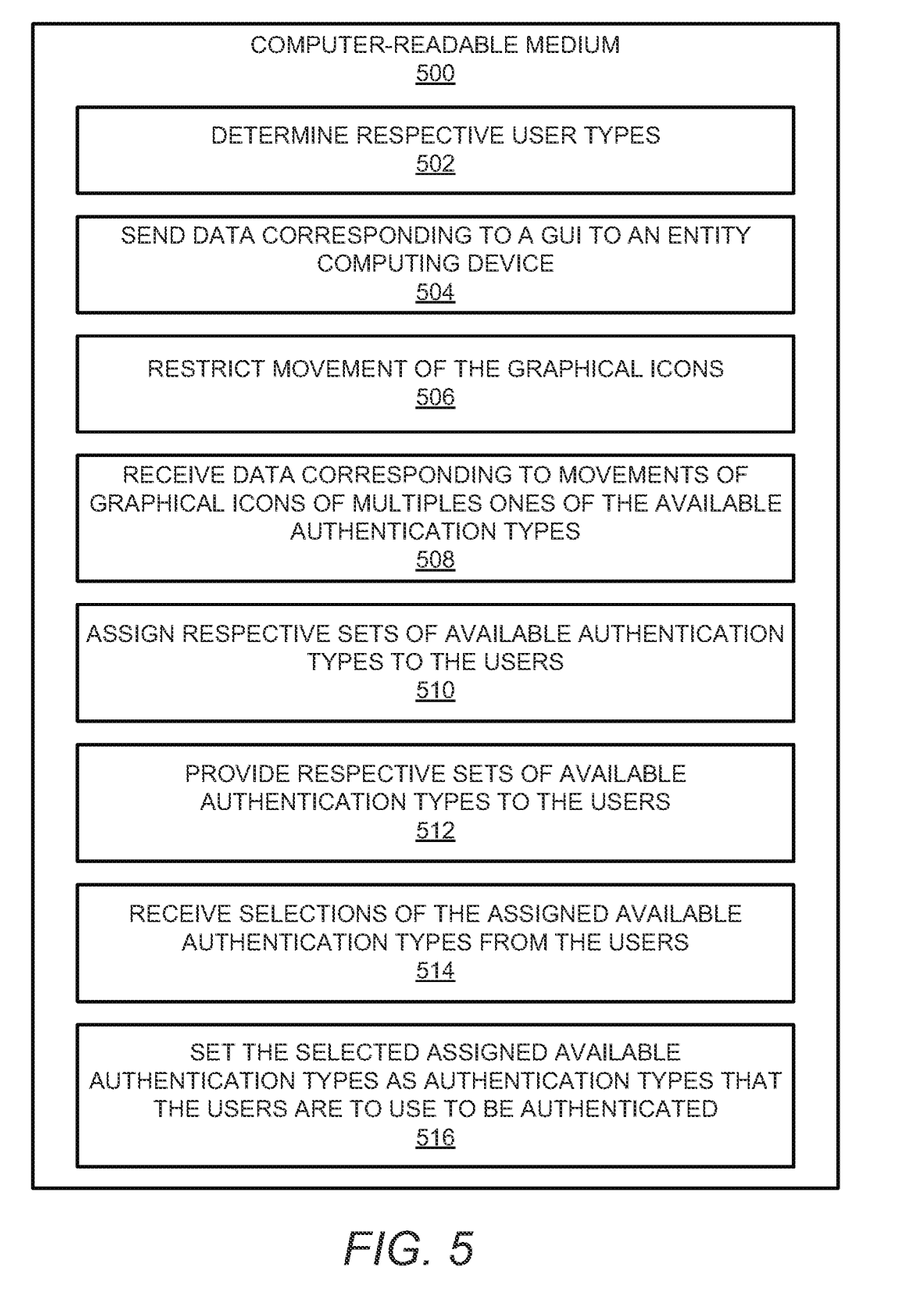
FIG. 5 shows a block diagram of a computer-readable medium that may have stored thereon computer-readable instructions for assigning authentication types to users based on movements of graphical icons representing the authentication types with respect to graphical icons representing the users.

Turning now to FIG. 5, there is shown a block diagram of a computer-readable medium 500 that may have stored thereon computer-readable instructions for assigning authentication types to users 120a-120n based on movements of graphical icons 140a-140m representing the authentication types with respect to graphical icons 150a-150n representing the users 120a-120n, in accordance with an embodiment of the present disclosure. It should be understood that the computer-readable medium 500 depicted in FIG. 5 may include additional instructions and that some of the instructions described herein may be removed and/or modified without departing from the scope of the computer-readable medium 500 disclosed herein. The computer-readable medium 500 may be a non-transitory computer-readable medium, in which the term "non-transitory" does not encompass transitory propagating signals.

The computer-readable medium 500 may have stored thereon computer-readable instructions 502-516 that a processor, such as a processor 104 of the apparatus 102 depicted in FIGS. 1 and 2, may execute. The computer-readable medium 500 may be an electronic, magnetic, optical, or other physical storage device that contains or stores executable instructions. The computer-readable medium 500 may be, for example, Random Access memory (RAM), an Electrically Erasable Programmable Read-Only Memory (EEPROM), a storage device, an optical disc, and the like.

The processor may fetch, decode, and execute the instructions 502 determine respective user types of a plurality of users 120a-120n. The processor may fetch, decode, and execute the instructions 504 to send data 112 corresponding to a graphical user interface 124 to a computing device 122 of an entity 118. The data 112 is to cause the computing device 122 to display the graphical user interface 124 to include graphical icons 140a-140m of a plurality of authentication types available for assignment to users 120a-120n. The data 112 may also cause the computing device 122 to display graphical icons 150a-150n of a plurality of users 120a-120n. The data 112 may further cause the computing device 122 to display locations corresponding to the respective graphical icons 150a-150n of the plurality of users 120a-120n at which multiple ones of the graphical icons 140a-140m representing the plurality of available authentication types are able to be positioned.

The processor may fetch, decode, and execute the instructions 506 to restrict movement of the graphical icons 140a-140m of some of the plurality of available authentication types to some of the locations based on the determined respective user types of the plurality of users 120a-120n. The processor may fetch, decode, and execute the instructions 508 to receive data corresponding to movements of multiple ones of the graphical icons 140a-140m representing the plurality of available authentication types with respect to the locations.

The processor may fetch, decode, and execute the instructions 510 to assign respective sets of authentication types to the plurality of users 120a-120n according to placements of the multiple ones of the graphical icons 140a-140m representing the plurality of available authentication types with respect to the locations. The processor may fetch, decode, and execute the instructions 512 to provide respective sets of available authentication types to the users 120a-120n. The processor may fetch, decode, and execute the instructions 514 to receive selections of the assigned available authentication types from the users 120a-120n. In addition, the processor may fetch, decode, and execute the instructions 516 to respectively set the selected authentication types to the users 120a-120n, in which the set authentication types are the authentication types that the users 120a-120n are to use to be authenticated.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated,

What is claimed is:

1. An apparatus comprising:
   a processor; and
   a memory on which is stored machine-readable instructions that when executed by the processor, cause the processor to:
      cause a graphical user interface to be displayed, the graphical user interface including:
         graphical icons of a plurality of authentication types available for assignment to users; and
         a graphical icon of a first user;
      detect a movement of a graphical icon of a first authentication type from a first location to a second location in the graphical user interface, the second location corresponding to the graphical icon of the first user; and
      based on the detected movement, assign the first authentication type to the first user.

2. The apparatus of claim 1, wherein the instructions cause the processor to:
   detect a movement of a graphical icon of a second authentication type from a third location to a fourth location in the graphical user interface, the fourth location corresponding to the graphical icon of the first user.

3. The apparatus of claim 2, wherein the instructions cause the processor to:
   based on the detected movement of the graphical icon of the second authentication type, assign the second authentication type as part of a multi-factor authentication process for the first user; or
   based on the detected movement of the graphical icon of the second authentication type, assign the second authentication type as part of an authentication type recovery process for the first user.

4. The apparatus of claim 2, wherein the instructions cause the processor to:
   based on the detected movement of the graphical icon of the second authentication type, identify the first authentication type and the second authentication type as authentication types that the first user is able to select for use by the first user in first user authentication processes.

5. The apparatus of claim 2, wherein the instructions cause the processor to:
   assign the first authentication type a first priority level based on the graphical icon of the first authentication type being moved to the second location in the graphical user interface; and
   assign the second authentication type a second priority level based on the graphical icon of the second authentication type being moved to the fourth location in the graphical user interface.

6. The apparatus of claim 5, wherein the instructions cause the processor to:
   cause the graphical user interface to display priority levels assigned to the second location and the fourth location.

7. The apparatus of claim 1, wherein the instructions cause the processor to:
  determine patterns in assignments of authentication types;
  determine an assignment of authentication types for a set of users;
  cause the determined assignment of authentication types for the set of users to be displayed; and
  receive an input regarding the displayed assignment of authentication types for the set of users.

8. The apparatus of claim 1, wherein the instructions cause the processor to:
  cause the graphical user interface to:
    display the graphical icons of the plurality of authentication types available for assignment in the first location in the graphical user interface;
    display a graphical icon of a second user;
    display a first area corresponding to the first user; and
    display a second area corresponding to the second user.

9. The apparatus of claim 8, wherein the instructions cause the processor to:
  detect a movement of a graphical icon of at least one of the plurality of authentication types to the second area corresponding to the second user; and
  based on the detected movement of the graphical icon of at least one of the plurality of authentication types, assign the at least one authentication type to the second user.

10. The apparatus of claim 1, wherein the instructions cause the processor to:
  based on the detected movement, cause the graphical user interface to display a preview screen that shows a security result of the assignment of the first authentication type to the first user.

11. A method comprising:
  sending, by a processor, data corresponding to a graphical user interface to a computing device of an entity, wherein the data is to cause the computing device to display the graphical user interface to include:
    graphical icons of a plurality of authentication types available for assignment to users; and
    a graphical icon of a first user;
  receiving, by the processor, data corresponding to a movement of a graphical icon of a first authentication type from a first location to a second location in the graphical user interface, the second location corresponding to the graphical icon of the first user; and
  based on the receipt of the data corresponding to the movement of the graphical icon of the first authentication type, assigning, by the processor, the first authentication type to the first user.

12. The method of claim 11, further comprising:
  determining a user type of the first user;
  identifying the plurality of authentication types available for assignment to the first user according to the determined user type of the first user; and
  sending data corresponding to the graphical user interface to cause the computing device to display the graphical user interface to include the graphical icons of the identified plurality of available authentication types.

13. The method of claim 11, further comprising:
  sending data to cause the computing device to display the graphical user interface to also include:
    graphical icons of a plurality of users; and
    locations corresponding to the respective graphical icons of the plurality of users at which multiple ones of the graphical icons representing the plurality of available authentication types are able to be positioned; and
  receiving data corresponding to movements of the multiple ones of the graphical icons representing the plurality of available authentication types with respect to the locations.

14. The method of claim 13, further comprising:
  determining that a first set of the graphical icons representing the available authentication types has been moved to a first location corresponding to the graphical icon of a first user;
  determining that a second set of the graphical icons representing the available authentication types has been moved to a second location corresponding to the graphical icon of a second user;
  assigning the first set of the available authentication types to the first user; and
  assigning the second set of the available authentication types to the second user.

15. The method of claim 14, further comprising:
  determining respective user types of the plurality of users;
  restricting assignment of the first set of the available authentication types to the first user based on a determined user type of the first user; and
  restricting assignment of the second set of the available authentication types to the second user based on a determined user type of the second user.

16. The method of claim 14, further comprising:
  providing to the first user, the first set of available authentication types;
  receiving, from the first user, a selection of at least one of the authentication types from the first set of available authentication types; and
  setting the selected at least one of the authentication types to the first user, wherein the first user is to use the set of at least one of the authentication types in a first user authentication process.

17. The method of claim 16, further comprising:
  determining an order at which the first user arranged the graphical icons of the selected at least one of the authentication types; and
  setting the selected at least one of the authentication types in an order of priority based on the determined order at which the first user arranged the graphical icons of the selected at least one of the authentication types.

18. A non-transitory computer-readable medium on which is stored computer-readable instructions that when executed by a processor, cause the processor to:
  send data corresponding to a graphical user interface to a computing device of an entity, wherein the data is to cause the computing device to display the graphical user interface to include:
    graphical icons of a plurality of authentication types available for assignment to users;
    graphical icons of a plurality of users; and
    locations corresponding to the respective graphical icons of the plurality of users at which multiple ones of the graphical icons representing the plurality of available authentication types are able to be positioned;
  receive data corresponding to movements of multiple ones of the graphical icons representing the plurality of available authentication types with respect to the locations; and
  assign respective sets of authentication types to the plurality of users according to placements of the multiple ones of the graphical icons representing the plurality of available authentication types with respect to the locations.

19. The non-transitory computer-readable medium of claim 18, wherein the instructions further cause the processor to:
   determine respective user types of the plurality of users; and
   restrict movement of the graphical icons of some of the plurality of available authentication types to some of the locations based on the determined respective user types of the plurality of users.

20. The non-transitory computer-readable medium of claim 18, wherein the instructions further cause the processor to:
   provide to a first user of the plurality of users, a first set of available authentication types assigned to the first user;
   receive, from the first user, a selection of at least one of the authentication types from the first set of available authentication types; and
   set the selected at least one of the authentication types to the first user, wherein the first user is to use the se at least one of the authentication types in a first user authentication process.

* * * * *